(No Model.)
A. H. EMERY.
PRESSURE GAGE.
No. 278,908. Patented June 5, 1883.
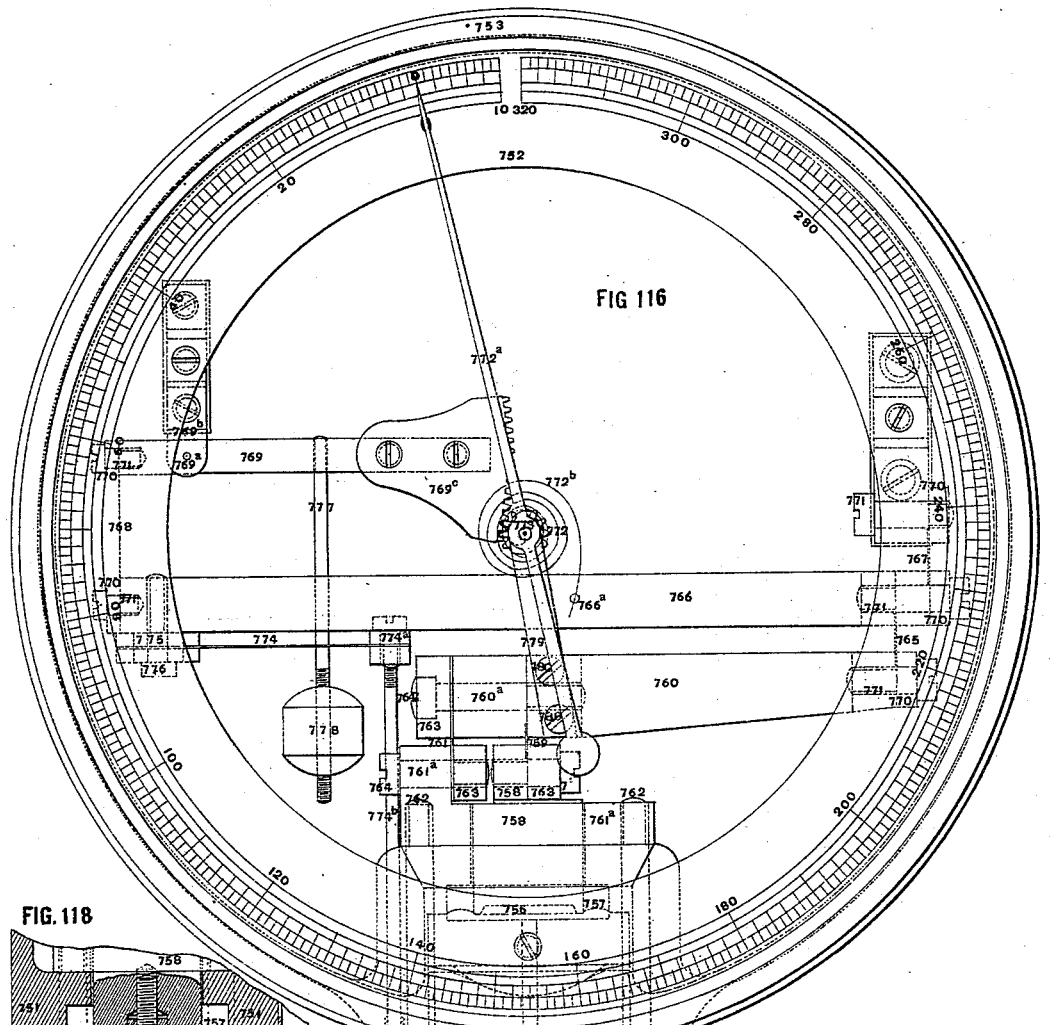
FIG. 116
FIG. 118
FIG. 117
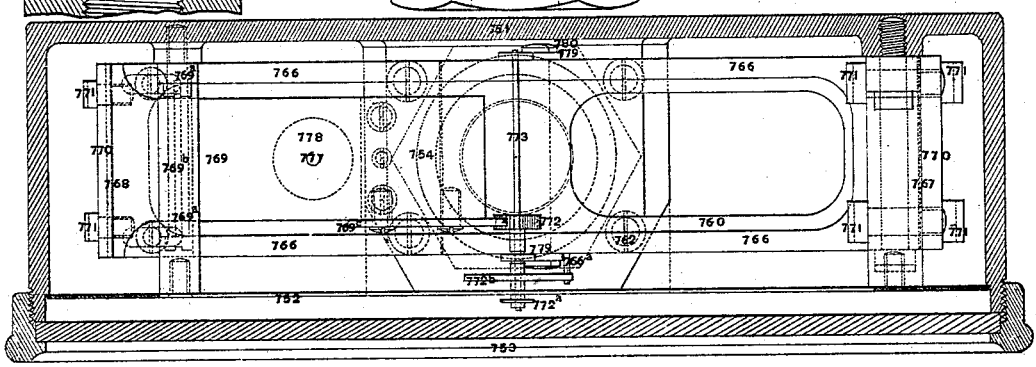
WITNESSES. Walter Allen, H. E. Knight
INVENTOR Albert H. Emery By Knight
attys

UNITED STATES PATENT OFFICE.

ALBERT H. EMERY, OF NEW YORK, N. Y., ASSIGNOR TO THE EMERY SCALE COMPANY, OF STAMFORD, CONNECTICUT.

PRESSURE-GAGE.

SPECIFICATION forming part of Letters Patent No. 278,908, dated June 5, 1883.

Application filed February 5, 1881. (No model.)

*To all whom it may concern:*

Be it known that I, ALBERT H. EMERY, of the city, county, and State of New York, have invented certain new and useful Improvements in Pressure-Gages, of which the following is a specification.

In this gage motion is communicated from the pressure-column to a rotary indicator through a series of levers connected to the case and to each other by flexible metallic plates and an additional lever working on a fixed fulcrum-pivot. The last lever carries a segment-rack gearing with a pinion on the indicator-shaft, and also carries one or more weight-arms, which may project either upward or downward, or both, and are provided with adjustable weights, for affording a variable and either increasing or decreasing resistance to the pressure, to adapt the indicator to conform to fixed graduations on the dial. To one of the transmitting-levers is attached a spring connected with an adjustable rod made of more or less expansible metal to compensate for changes in temperature. The adjustment of this rod in the case sets the needle in position. The adjustment of the connecting-spring graduates the resistance to the pressure. The bearings of the indicator are in brackets attached to one of the transmitting-levers. A hair-spring is employed to keep the pinion-teeth in close contact with those of the segment-rack, said spring being attached at one end to the indicator-shaft and at the other end to one of the transmitting-levers.

This invention is represented in the accompanying drawings by three figures, numbered 116 to 118, inclusive. Figure 116 is a front elevation of a gage illustrating the invention. Fig. 117 is a central horizontal section of the same. Fig. 118 is a vertical section.

751 represents a cylindrical case provided with a dial, 752, and covered by a glazed front, 753, attached in any suitable manner.

754 is a hollow screw-plug, by which the gage-case is connected with any object containing fluid under pressure which is to be measured. The said hollow plug bears upward by a concavo-convex, plano-convex, or double-convex joint of such form as to bring the pressure at or near the center against a sealing-plug, 755, which forms the base of the liquid-pressure chamber 756, and clamps the periphery of a flexible metallic diaphragm, 757, by which the said chamber is closed.

758 is a pressure-column resting upon or connected with the diaphragm 757, as preferred, and connected by a thin flexible plate, 759, with a lever, 760, which is fulcrumed by a thin flexible plate, 761, to a bracket, 761$^a$, projecting upward within the case from the stationary neck thereof, and secured thereto by screws 762. Between the plates 759 and 761 is a fulcrum-block, 760$^a$, which, with the clamp-plates 763 and screws 764, connects these plates to the pressure-column 758, lever 760, and bracket 761$^a$. The free end of the lever 760 is connected by a thin flexible plate, 765, with a secondary lever, 766, fulcrumed to the case by a thin flexible plate, 767, and connected by a long flexible plate or plates, 768, with the lever-frame 769. The plates 765 767 768 are attached by clamp-plates 770 and screws 771. The lever-frame 769 is fulcrumed at 769$^a$ to a stationary bracket, 769$^b$, and carries at its extremity a segmental rack, 769$^c$, gearing with the pinion 772 of the rotary indicator 772$^a$.

772$^b$ represents a hair-spring attached at one end to the indicator-shaft 773 and at the other end by a stud, 766$^a$, to the lever 766, and offering such slight resistance to the rotation of the indicator as will serve to keep the working parts in contact. The pressure is resisted by a plate-spring, 774. This spring is connected at one end by a clamp, 774$^a$, to the extremity of a rod, 774$^b$, screwed within the case 751, and clamp 774$^a$, so as to admit of adjusting the bearing of the spring up or down, as required, for setting the needle or indicator to zero without opening the case. For this purpose the rod 774$^b$ has threads of different pitch on its respective ends, or they may be right and left handed. The other end of the spring 774 is fastened adjustably to the lever 766 by a slotted clamp, 775, held by a screw, 776. The longitudinal adjustment of this clamp on the spring 774 by varying its effective length regulates its resistance to the movement of the load-levers. The rod 774$^b$ is made for a part or the whole of its length of metal either more or less expansible than the material of the case, in order to counteract the effect of variations in temperature, the rod being attached to either the top or bottom of the case, as may be required to secure this result.

One or more arms, 777, projecting either upward or downward from the lever 769, and provided with an adjustable weight or weights, 778, are employed to afford a variable and either increasing or decreasing resistance to the motion of the levers, as may be found requisite in order to adapt the indicator of a given gage to work correctly in connection with fixed graduations on the dial. The bearings of the indicator-shaft 773 are in brackets 779, fixed to the lever 760 by screws 780. By this means the adjoining parts requiring delicate adjustment may be put together and adjusted in position before they are inserted in the case.

The diaphragm 757 may be of disk form, with the pressure-column 758 resting on it, as illustrated in Fig. 116; or it may be in annular form, soldered or otherwise secured liquid-tight to a clamp-plate, 780$^a$, the latter being fixed to the pressure-column 758 by a screw, 780$^b$, as illustrated in Fig. 118. The instrument is thus adapted for use either as a pressure-gage or as a vacuum-gage, indicating either the pressure on the under side of the diaphragm of fluid in the chamber 756 or the pressure of the atmosphere on the upper side of the diaphragm when the said chamber is partially exhausted.

The indicator-scale may be suitably graduated, as shown in Fig. 116, to indicate both pressure and vacuum. A steam-gage is thus adapted to indicate the existence and extent of a vacuum within a boiler. When the instrument is intended to indicate vacuum only, the diaphragm is curved in the opposite direction, as illustrated in another application.

Any novel subject-matter which I have described and not claimed or attempted to claim herein I have claimed or attempted to claim in other applications or have reserved to be claimed in future original applications.

The following is here claimed as new:

1. The combination of a gage-case, 751, pressure-column 758, and load-transmitting plate 759, substantially as set forth, with suitable transmitting and indicating devices.

2. The combination of a gage-case, 751, and a load-lever, 760, with a flexible fulcrum-plate, 761, for connecting them.

3. The combination of the gage-case 751, fulcrum-block 761$^a$, holding-screws 762, load-lever 760, and flexible fulcrum-plate 761, as and for the purposes set forth.

4. The combination of the gage-case 751, pressure-column 758, flexible fulcrum-plate 761, load-lever 760, and flexible load-transmitting plate 759, as and for the purposes set forth.

5. The combination of the indicator-lever 769 with one or more transmitting-levers, 760 766, flexible connecting plate or plates, segment-rack 769$^c$, and indicator-pinion, substantially as and for the purposes set forth.

6. The combination, with the indicator-lever 769, of one or more weighted arms extending either above or below said lever to offer a varying resistance to the pressure.

7. The bearings of the indicator-shaft, mounted on the load-lever 760, substantially as set forth.

8. The hair-spring 772$^b$, attached at one end to the indicator or needle shaft, and at the other end to a load-lever, as set forth.

9. The combination of a pressure-column, one or more transmitting-levers, an indicator, and a setting-screw communicating with one of the transmitting-levers through the medium of a spring, for the purpose of adjusting the position of the indicator without opening the case, substantially as set forth.

10. The combination, with the gage-case 751 and resisting-spring 774, of the screw-rod 774$^b$, for regulating the resistance of the said spring and setting the indicator from the outside, substantially as set forth.

11. The combination of the gage-case 751, the adjusting screw-rod 774$^b$, spring 774, and load-lever 766, for the purpose of setting the indicator in position or compensating for changes in temperature.

12. In combination with one of the load-levers, the resisting-spring 774, adjustable slotted clamp 775, and screw 776, for regulating the resistance of the spring, substantially as set forth.

13. The combination, in a pressure-gage, of a pressure-column, a rotary indicator, one or more transmitting-levers, and one or more flexible plates connecting said levers, substantially as set forth.

14. The combination, in a pressure-gage, of a pressure-column, a rotary indicator, and one or more transmitting-levers attached to the case by flexible fulcrum-plates, as set forth.

ALBERT H. EMERY.

Witnesses:
LUDWIG HAILER,
MAHLON RANDOLPH.